(12) United States Patent
Fudono et al.

(10) Patent No.: US 6,515,398 B1
(45) Date of Patent: Feb. 4, 2003

(54) ALTERNATOR HAVING PASSAGE FOR VENTILATING SLIP-RING SURFACE

(75) Inventors: Kiyoshi Fudono, Kariya (JP); Hitoshi Irie, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/425,058

(22) Filed: Oct. 22, 1999

(30) Foreign Application Priority Data

Feb. 4, 1999 (JP) ............................................ 11-027145

(51) Int. Cl.[7] ............................ H02K 13/00; H02K 1/04
(52) U.S. Cl. .......................................... 310/239; 310/59
(58) Field of Search ................................ 310/232, 242, 310/239, 238, DIG. 6

(56) References Cited

U.S. PATENT DOCUMENTS

| | | | |
|---|---|---|---|
| 4,823,032 A | * 4/1989 | Ward | 310/43 |
| 4,959,576 A | 9/1990 | Horibe et al. | 310/239 |
| 5,424,600 A | 6/1995 | Ishikawa et al. | 310/220 |
| 5,977,669 A | * 11/1999 | Yoahida | 310/68 B |

FOREIGN PATENT DOCUMENTS

| | | | |
|---|---|---|---|
| FR | 2732830 | 11/1996 | |
| JP | 363302747 | * 12/1998 | H02K/09/28 |

* cited by examiner

*Primary Examiner*—Tran Nguyen
*Assistant Examiner*—Karen Addison
(74) *Attorney, Agent, or Firm*—Oliff & Berridge, PLC

(57) ABSTRACT

In an alternator for use in an automobile, a passage for ventilating air around slip-rings is formed on a rear cover that covers a rear end of the alternator where the slip-rings are disposed. A brush device for supplying exciting current to a rotor through the slip-rings is mounted around the slip-rings, and the axial rear end of the brush device is covered with the rear cover. A space enclosed by the brush device and the rear cover is formed around the slip-rings, and air in the enclosed space is ventilated through the ventilation passage when the alternator is driven. The slip-rings heated through operation are cooled down, and brush powder in the enclosed space is exhausted.

12 Claims, 6 Drawing Sheets

ALTERNATOR HAVING PASSAGE FOR VENTILATING SLIP-RING SURFACE

CROSS-REFERENCE TO RELATED APPLICATION

This application is based upon and claims benefit of priority of Japanese Patent Application No. Hei-11-27145 filed on Feb. 4, 1999, the content of which is incorporated herein by reference.

BACKGROUND OF THE INVENTION

1. Field of the Invention

The present invention relates to an alternator or an AC generator for use in an automotive vehicle.

2. Description of Related Art

In order to protect slip-rings mounted on a rear end of a rotary shaft of an alternator against water, oil or other foreign particles, a structure to seal a circumferential space of the slip-rings is known hitherto. In the conventional device, a brush holder and a slip-ring cover are assembled to an alternator housing interposing a seal member therebetween. A ventilation passage for cooling the slip-rings and for exhausting bush power is formed by the seal member. For example, JP-A-7-32571 discloses a sealing structure in which slip-rings are covered with a brush holder and a slip-ring cover, both being mounted on a rear frame or a rear cover with a seal member interposed therebetween, so that the circumferential space of slip-rings is sealed from outside. A ventilation passage is formed on the seal member that connects the circumferential space of the slip-rings and an outside space, and an outlet of the ventilation passage is covered with a protecting member.

However, the conventional sealing structure is complex, and accordingly the manufacturing cost of the alternator becomes high. Especially, it is necessary to provide a die having a complex structure to form such a seal member that includes the ventilation passage. Though it is preferable that the ventilation passage is labyrinth-shaped, the die structure becomes more complex to form such a ventilation passage on the seal member. Moreover, it is not easy to correctly assemble the seal member having the ventilation passage without unnecessarily deforming the same, because the seal member is usually made of a resilient material such as rubber. If the ventilation passage is deformed, the circumferential space of the slip-rings is not properly sealed from the outside space. When the sealing is not proper, an amount of ventilation air decreases, or no ventilation is performed, and thereby slip-ring temperature would become excessively high and the brush powder would not be exhausted. Further, when a pair of seal members, each having a different shape or being made of a different material, are attached to both sides of the brush holder and the slip-ring cover, it would become more difficult to properly assemble both seal members. If the seal members are not assembled properly, the brushes would contact the slip-rings with a slanted angle, thereby causing decrease in field current and decrease in output of the alternator.

SUMMARY OF THE INVENTION

The present invention has been made in view of the above-mentioned problem, and an object of the present invention is to provide an improved alternator in which the circumferential space of slip-rings is properly ventilated through a ventilation passage that is easily formed in the alternator.

An alternator or an AC generator for use in an automobile is generally composed of a housing, a stator having 3-phase windings housed in the housing, a rotor rotatably supported in the housing within the stator. The rotor having a field coil is driven by an engine, and thereby alternating current is generated in the stator windings which are rectified into direct current. The direct current is supplied to a battery that supplies power to other electric components. Slip-rings are mounted on one end of a rotor shaft, and a brush device for supplying exciting current to the rotor through the slip-rings is disposed around the slip-rings.

The brush device includes a brush holder for holding brushes therein and a cylindrical slip-ring cover for covering the outer peripheral space of the slip-rings. The brush holder is integrally connected to the slip-ring cover to form the brush device. An axial end surface of the brush device is covered with a rear cover. A circumferential space surrounding the slip-rings is formed by the brush device and the rear cover. The circumferential space is sealed from the outside space so that the slip-rings and the brushes are protected against water, oil or other particles. A ventilation passage that connects the circumferential space to the outside of the brush device is formed on the inner surface of the rear cover, so that the slip-rings heated under operation are cooled down and brush powder are exhausted.

Preferably, the ventilation passage is made in a labyrinth shape to surely prevent water from entering into the circumferential space. When the rear cover is made of a resin material by molding, a complex shape of the labyrinth is easily formed on the rear cover. It is also preferable to interpose a seal member such as a rubber sheet between the brush device and the rear cover to enhance sealing of the circumferential space and the ventilation passage. The resin-made rear cover is preferably reinforced by embedding a metallic insert-plate therein in the molding process to prevent the rear cover from being deformed when it is fastened to the housing with bolts and nuts. Preferably, portions of the embedded insert-plate are exposed to the outside surface of the rear housing so that the fastening nuts directly sit on the insert-plate. A fringe wall around the outer opening of the ventilation passage and a standing wall covering the upper side of the outer opening may be formed on the rear cover to further protect the ventilation passage against water.

Since the ventilation passage is formed on the rear cover according to the present invention, there is no need to form the passage having a complex shape on a resilient seal member. Accordingly, the structure including the ventilation passage is simplified while improving air-tightness of the circumferential space, and the brush device and the rear cover is easily assembled.

Other objects and features of the present invention will become more readily apparent from a better understanding of the preferred embodiment described below with reference to the following drawings.

DETAILED DESCRIPTION OF THE PREFERRED EMBODIMENT

A preferred embodiment of the present invention will be described with reference to the accompanying drawings.

Figure 1:
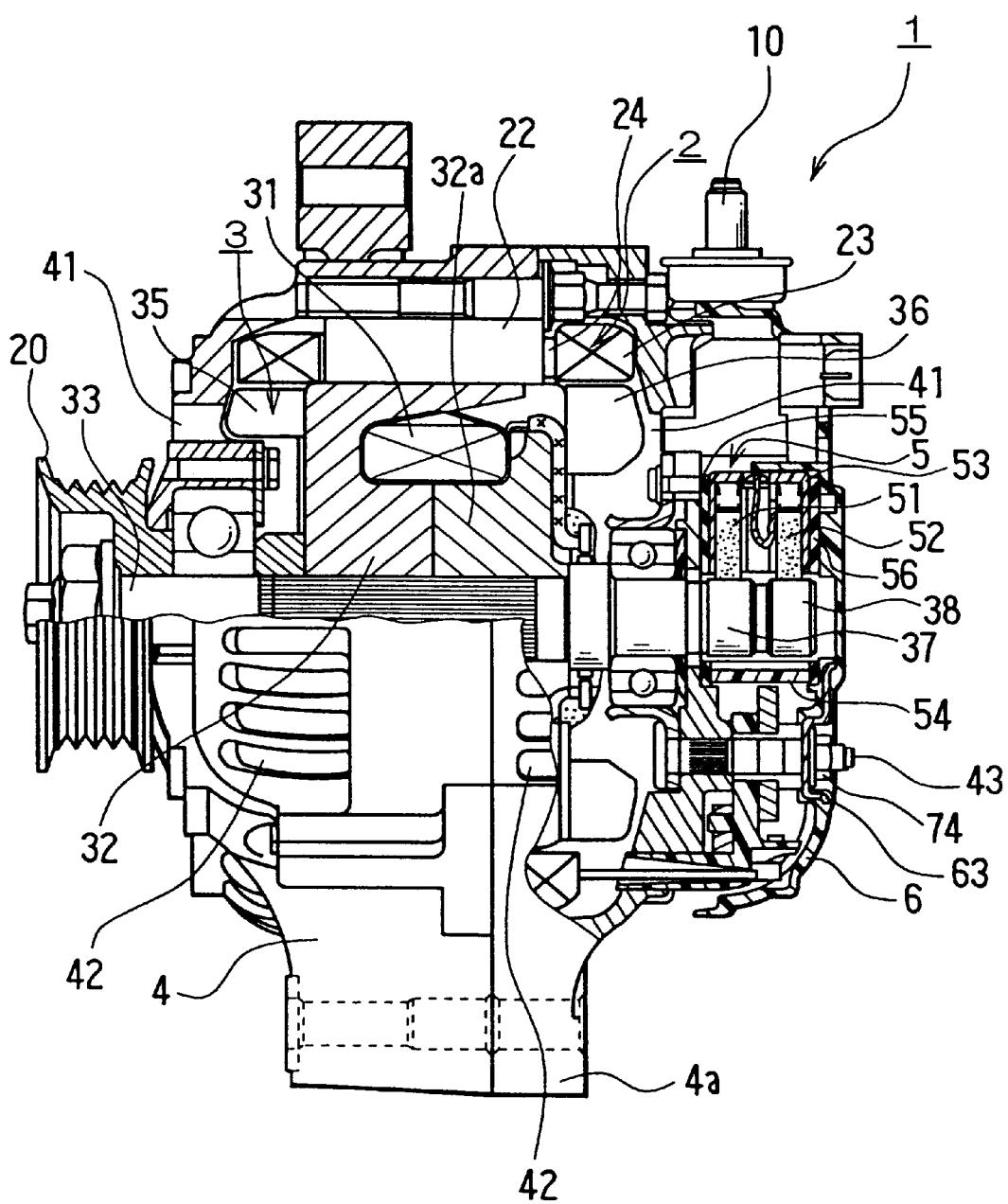
FIG. 1 is a cross-sectional view showing a whole structure of an alternator of the present invention.

First, referring to FIG. 1, the whole structure of an alternator 1 of the present invention will be described. A stator 2 is fixedly supported by a front housing 4 and a rear housing 4a. A rotor 3 having a rotary shaft 33 is rotatably supported by the pair of housings 4, 4a and located inside of the stator 2. A brush device 5 is disposed at the rear side of the alternator 1 and is covered by a rear cover 6. The stator 2 is composed of a stator core 22 and 3-phase stator windings 23 insulated by insulators 24 from the stator core 22.

The rotor 3 is composed of a rotary shaft 33; a pair of pole cores 32, 32a, each having three claws, fixed to the rotary shaft 33; and field coil 31 that is wound on the pole cores 32, 32a. An insulated copper wire is coaxially wound to form the cylinder-shaped field coil 31. The cylinder-shaped filed coil 31 is disposed inside of the claws of the pair of pole cores 32, 32a. A cooling fan 35 for introducing cooling air form the front side and for blowing it out in both axial and radial directions is attached to the front side pole core 32 by welding or the like. Similarly, a cooling fan 36 for introducing cooling air from the rear side and for flowing it out in the radial direction is attached to the rear side pole core 32a. A pair of slip-rings 37, 38 is fixed to the rear end of the rotary shaft 33. Each slip-ring 37, 38 is electrically connected to each end of the field coil 31, and exciting current is supplied to the field coil 31 from a pair of brushes 51, 52, each contacting each slip-ring 37, 38.

A pair of housings 4, 4a contains the stator 2 therein, and the rotor 3 is rotatably supported in the pair of housings 4, 4a with a certain air gap formed between the outer surface of the rotor 3 and the inner surface of the stator 2. Outlet windows 42 for blowing out cooling air are formed on the housings 4, 4a at positions facing end portions of the stator windings 23, and inlet windows 41 for introducing cooling air are formed on the housings 4, 4a at their flat sufaces.

The brush device 5 is composed of a brush holder 53 that holds a pair of brushes 51, 52; a slip-ring cover 54 that covers the outer periphery of the slip-rings 37, 38 in cooperation with the brush holder 53; and a pair of seal members 55, 56, each of which is disposed at each axial end of the brush device 5 for tightly sealing a circumferential space of the slip-rings from the outside space. The seal members 55, 56 are plate-shaped and made of rubber. The details of the brush device 5 will be explained later.

A rear cover 6 covers the brush device 5, rectifiers and an IC regulator mounted on the outside of the rear housing 4a, and protects those components from foreign particles. The rear cover 6 is made of a resin material. The rear cover 6 has plural inlet windows 61 (FIG. 5) for introducing cooling air, three mounting holes 62 through which mounting bolts 43 are inserted, and an insert-plate 63 for mechanically strengthening the region where the mounting holes are formed. Details of the rear cover 6 will be further described later.

The rotor 3 of the alternator 1 is driven by an automotive engine (not shown) through a V-belt that couples an alternator pulley 20 and the engine. Magnetic field is formed in and around the rotor 3 by excitation current supplied to the field coil 31, and 3-phase alternating current is generated in the stator windings 23. The alternating current is rectified into direct current by the rectifiers and is taken out from an output terminal 10.

Figure 2:
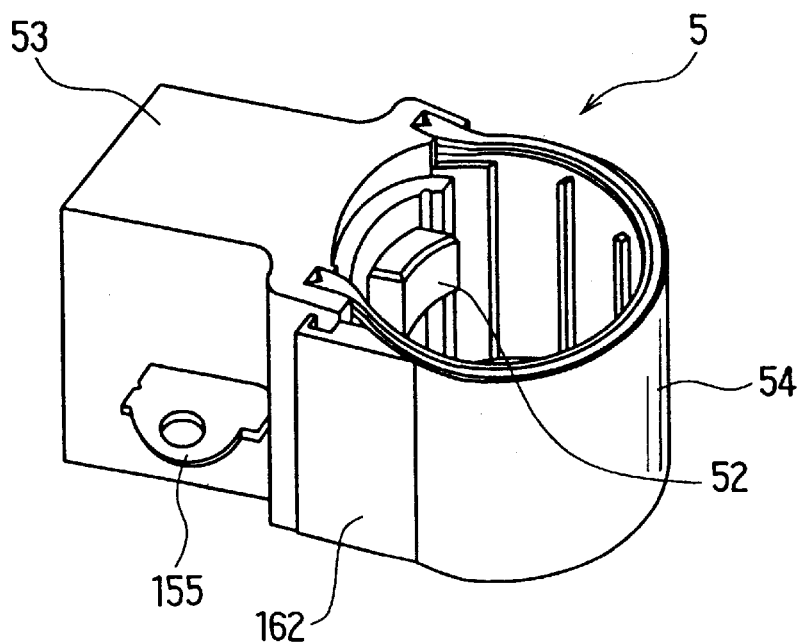
FIG. 2 is a perspective view showing a brush device used in the alternator shown in FIG. 1.
Figure 3:
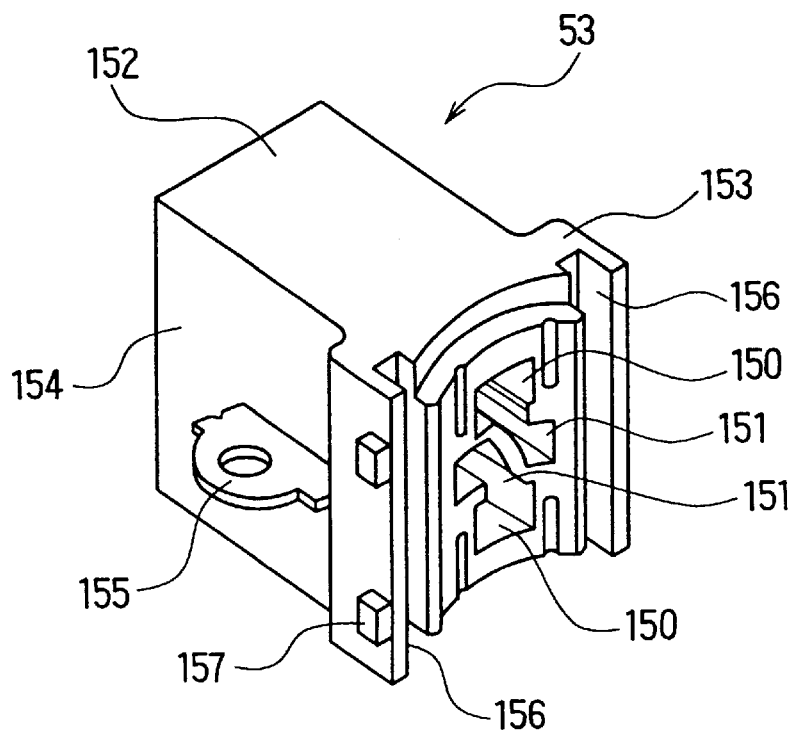
FIG. 3 is a perspective view showing a brush holder that is a part of the brush device shown in FIG. 2.
Figure 4:
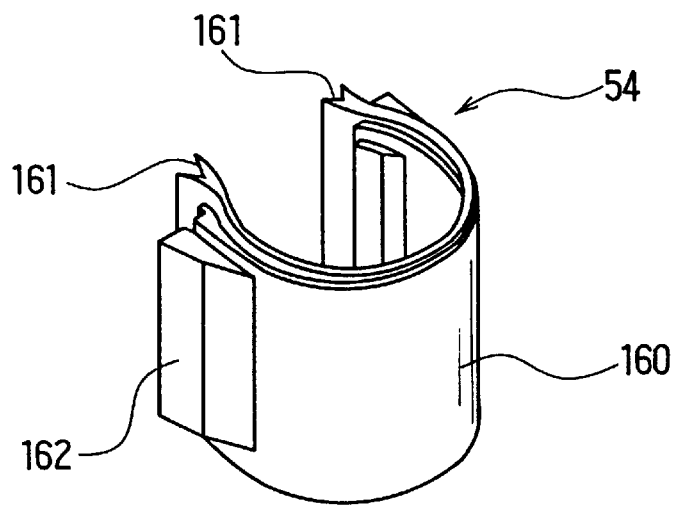
FIG. 4 is a perspective view showing a slip-ring cover that is a part of the brush device shown in FIG. 2.

Referring to FIGS. 2, 3 and 4, details of the brush device 5 will be described. FIG. 2 shows the assembled brush device 5 that includes the brush holder 53, the slip-ring cover 54 and brushes 51, 52 held in the brush holder 53. FIGS. 3 and 4 show the brush holder 53 and the slip-ring cover 54, respectively. The brush holder 53 is made of thermosetting resin and includes a box-shaped portion 152 and an enlarged fringe portion 153. A pair of square holes 150 for slidably holding a pair of brushes 51, 52 therein and a pair of spaces 151 for containing pig tails (lead wires) connected to the brushes are formed in the brush holder 53. A pair of metallic terminals 155 for supplying current to the brushes is embedded in the brush holder 53, so that each terminal 155 sticks out from each side surface 154 of the box-shaped portion 152. The enlarged fringe portion 153 has a concave surface that is curved along the outer diameter of the slip-lings 37, 38. A pair of rectangular grooves 156 for connecting the slip-ring cover 54 is formed on the enlarged fringe portion 153 at its both sides. A pair of projections 157 for engaging with hooks 162 of the slip-ring cover 54 is formed on each side of the grooves 156.

As shown in FIG. 4, the slip-ring cover 54 for covering the slip-rings is substantially cylinder-shaped with about one-fourth portion thereof removed. The slip-ring cover 54 is made of resin such as nylon and includes a cylindrical wall 160, a pair of V-shaped engaging portions 161 formed at both ends of the cylindrical wall 160 and a pair of hooks 162 formed on both sides of the cylindrical wall 160.

The brush holder 53 and the slip-ring cover 54 are assembled to form the brush device 5 shown in FIG. 2. The V-shaped engaging portions 161 of the slip-ring cover 54 are slid into the grooves 156 of the brush holder 53, and the hooks 162 engage with the projections 157. Since the length of the grooves 156 and the V-shaped engaging portions 161 is made in the same size, both axial surfaces of the assembled brush device 5 are flat.

Figure 5:
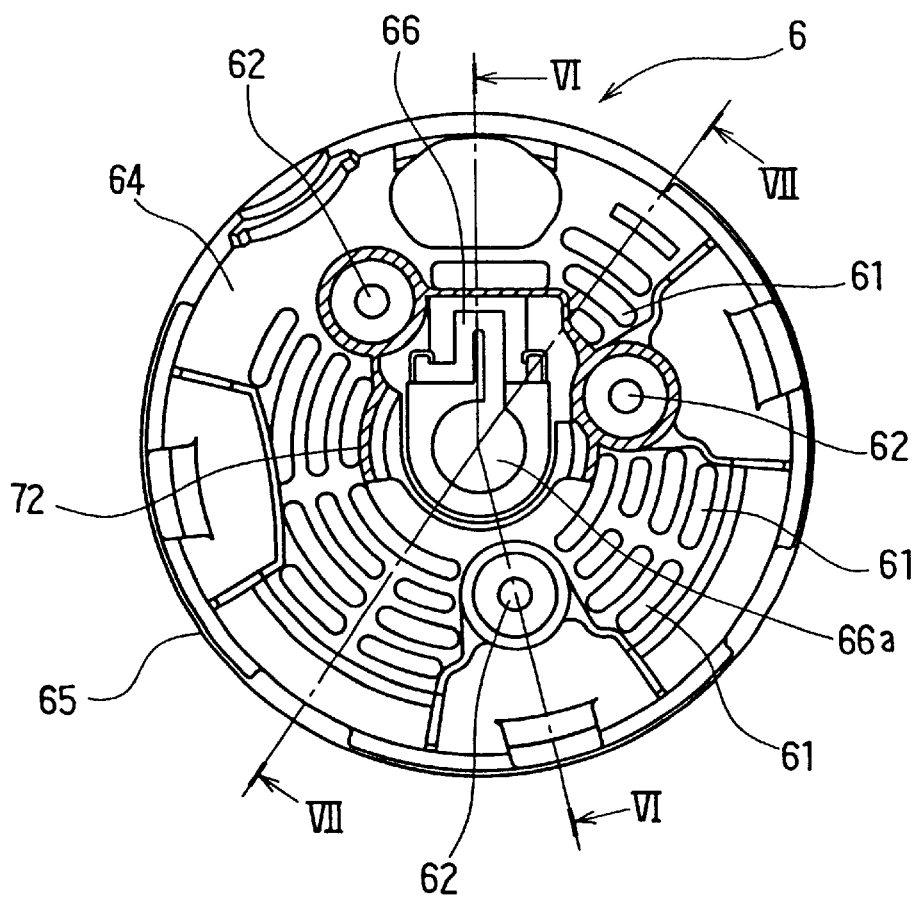
FIG. 5 is a plan view showing a rear cover that covers a rear side of the brush device, viewed from the inside of the alternator.
Figure 6:
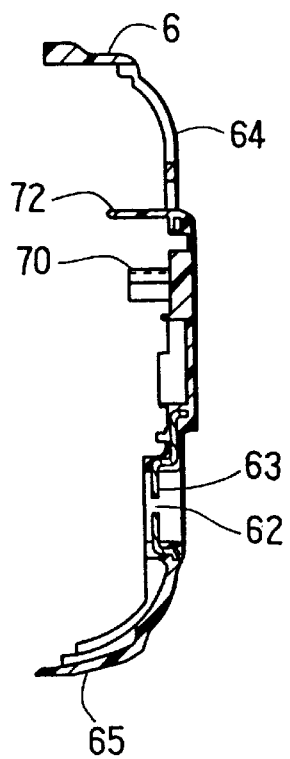
FIG. 6 is a cross-sectional view showing the rear cover, taken along line VI—VI of FIG. 5.
Figure 7:
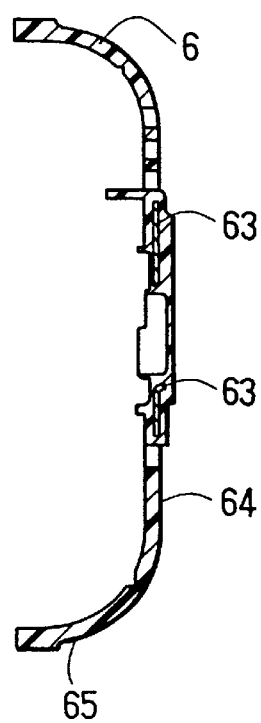
FIG. 7 is a cross-sectional view showing the rear cover, taken along line VII—VII of FIG. 5.
Figure 8:
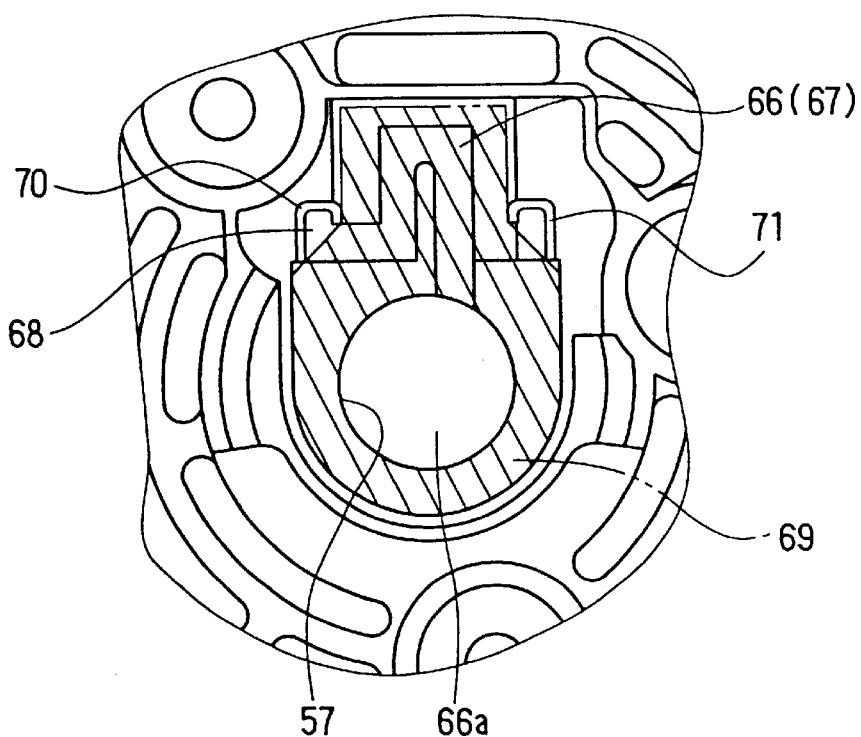
FIG. 8 is a plan view showing, in an enlarged scale, a region where a labyrinth-shaped ventilation passage is formed on the inside surface of the rear cover.

FIG. 5 shows the rear cover 6, viewed from the inside of the alternator 1. FIGS. 6 and 7 show cross-sectional views of the rear cover 6, taken along line VI—VI and line along VII—VII of FIG. 5, respectively. The rear cover 6 for covering the brush device 5 at its rear side is composed of a plane portion 64 and a cylindrical portion 65 extending perpendicularly from the plane portion 64. A labyrinth-shaped groove 66 is formed on the plane portion 64 in a region where the rear cover 6 faces the brush device 5 with a seal member 56 interposed therebetween. One end of the groove 66 merges with an inner wall 57 of a depressed portion 66a formed at the center of the rear cover 6 (FIG. 8). The labyrinth-shaped groove 66 forms a ventilation passage 67 when the brush device 5, the seal member 56 and the rear cover 6 are all assembled.

Figure 9:
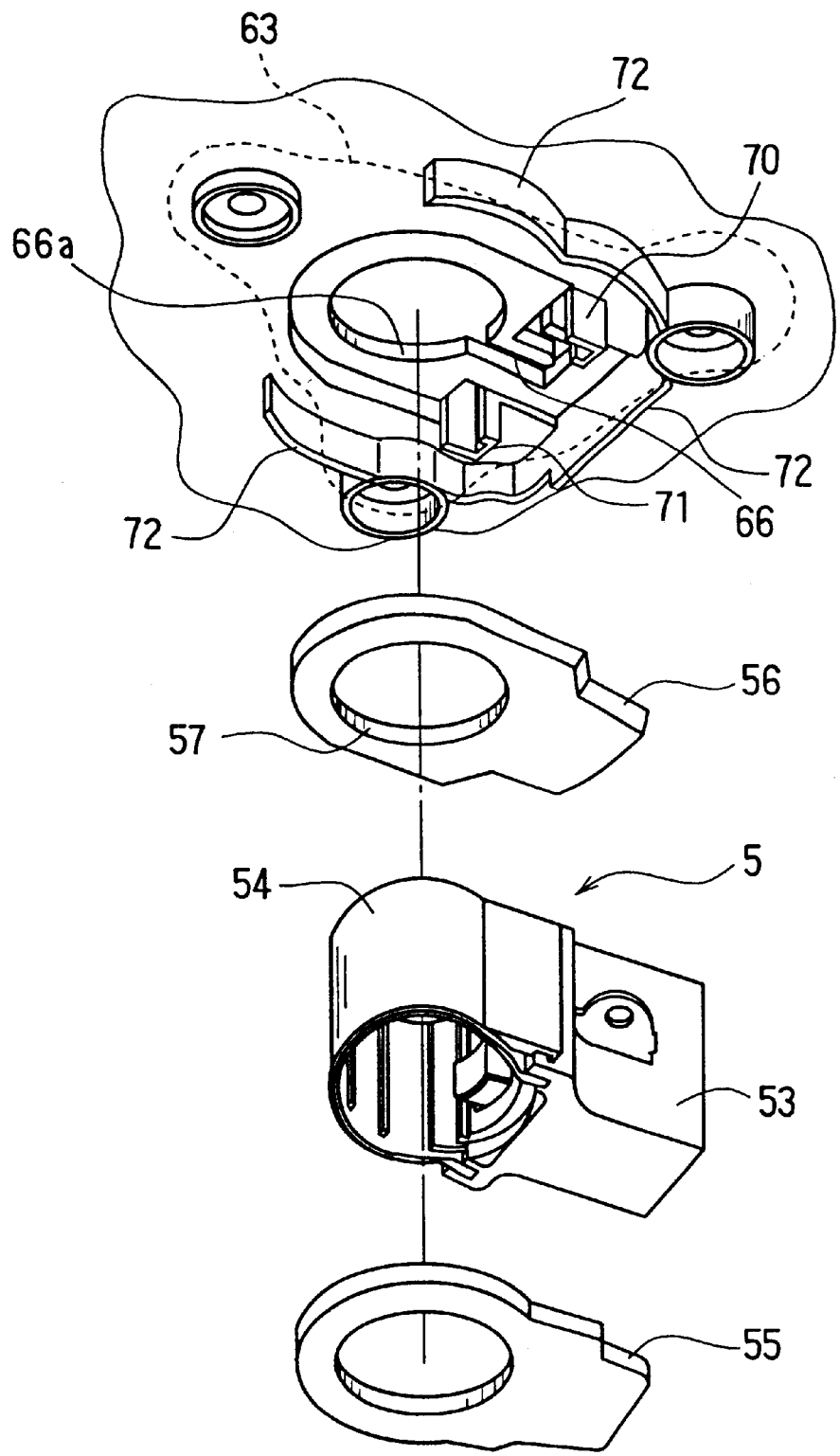
FIG. 9 is an exploded perspective view showing a detailed structure of the brush device including the ventilation passage and other components.

Details of the ventilation passage 67 are shown in FIG. 8 in an enlarged scale, and a perspective view of the ventilation passage 67 is shown in FIG. 9 together with other components to be assembled with the rear cover 6. The hatched region 69 in FIG. 8 is the region which is covered with the seal member 56. By covering the groove 66 formed on the rear cover 6 with the seal member 56, the ventilation passage 67 is formed. The ventilation passage 67 connects the circumferential space of the slip-rings 37, 38, and an outside 25 space of the brush device 5. The circumferential space is enclosed by the brush holder 53, the slip-ring cover 54 and an inner wall 57 of the seal member 56. In other words, the ventilation passage 67 is open to the circumferential space at one end and open to the outside space of the brush device 5 at the other end where an opening 68 is formed (FIG. 8). The circumferential space of the slip-rings is open only to the ventilation passage 67, and is air-tightly sealed by the brush device 5 and the pair of seal members 55, 56 that are positioned at both axial ends of the brush device 5. When the pressure in the circumferential space of the slip-rings decreases or increases according to rotation of the rotor 3, air in the circumferential space is ventilated through the ventilation passage 67. The slip-rings 37, 38 are cooled down by the ventilating air, and brush powder formulated by sliding abrasion between the brushes 51, 52 and the slip-rings 37, 38 is exhausted through the ventilation passage 67.

Fringe walls 70, 71 are formed at the sides of the region where the seal member 56 is positioned (the hatched region in FIG. 8), so that they perpendicularly extend from the plane portion 64 of the rear plate 6 as shown in FIG. 6. Also, a standing wall 72 (a hatched portion in FIG. 5) is formed on the plane surface 64 of the rear cover 6 in an area surrounding the fringe walls 70, 71. The standing wall 72 also perpendicularly extends from the plane portion 64 of the rear cover 6 as shown in FIG. 6. The fringe walls 70, 71 serve to position the seal member 56 therebetween. One of the fringe walls 70 also defines the opening 68 of the ventilation passage 67 as shown in FIG. 8. The opening 68 of the ventilation passage 67 is protected by the fringe wall 70 against water or oil that may otherwise enter into the opening 68 when vacuum is created in the ventilation passage 67. The standing wall 72 is higher than the fringe wall 70 that defines the opening 68 and is positioned above the fringe wall 70 Therefore, the opening 68 is further protected from being directly hit by water that may enter from cooling air inlet windows 61 formed on the rear cover 6.

Figure 10:
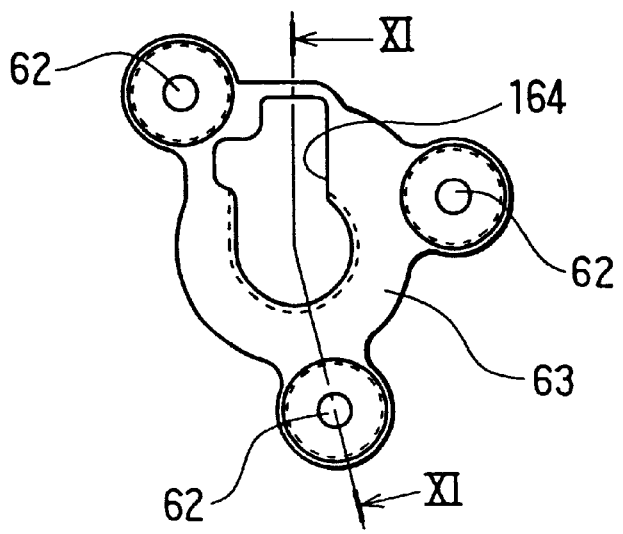
FIG. 10 is a plan view showing an insert plate to be embedded in the rear cover.
Figure 11:
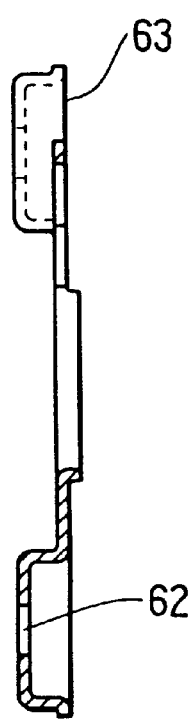
FIG. 11 is a cross-sectional view showing the insert plate, taken along line XI—XI of FIG. 10.

An insert-plate 63 shown in FIGS. 10 and 11 is embedded in the resin-molded rear plate 6 to encompass the region 69 to be covered with the seal member 56. The insert-plate 63 is made of a metal plate and increases mechanical strength of the resin-made rear plate 6. FIG. 10 shows a plan view of the insert plate 63, and FIG. 11 shows a cross-sectional view thereof, taken along line XI—XI of FIG. 10. The insert-plate 63 includes three mounting holes 62 through which mounting bolts 43 (FIG. 1) stick out and an opening 164 that corresponds to the area where the depressed portion 66a and the groove 66 are located. In other words, the depressed portion 66a and the groove 66 are positioned in the area overlapping with the opening 164, so that both the depressed portion 66a and the groove 66 are made with a sufficient depth without interfering with the insert-plate 63. The width of the opening 164 is made smaller than that of the seal member 56, so that the seal member 56 is securely and directly held between the insert-plate 63 and the brush device 5 when they are fastened together by bolts 43 and nuts 74. The portions where the mounting holes 62 are formed are depressed toward the front side as shown in FIG. 11. The insert-plate 63 is embedded in the rear cover 6 so that the mounting holes 62 are exposed to the outer surface of the rear cover 6 as shown in FIG. 6. Therefore, fastening force by bolts 43 and nuts 74 is directly imposed on the insert-plate 63.

Advantages of the present invention will be summarized as follows. Since the ventilation passage 67 for ventilating the space circumferencing the slip-rings 37, 38 is formulated by the groove 66 formed on the rear cover 6 and the seal member 56 covering the groove 66, the ventilation passage 67 can be easily made without forming the seal member in a complex shape. Since the seal member 56 is a simple plate, as opposed to the conventional seal member having a complex passage formed therein, the process for assembling the components forming the ventilation passage 67 can be easily and precisely performed, and the situation where the brushes contact the slip-rings with a slanted angle can be surely avoided. Also, the space circumferencing the slip-rings and the ventilation passage can be surely sealed from the outside space. Since the rear cover 6 is mechanically strengthened by embedding the insert-plate 63, air-tightness of the ventilation passage 67 and the circumferential space of the slip-rings 37, 38 are further enhanced.

Though the rear cover 6 is made of a resin material and is strengthened by the insert-plate 63 in the foregoing embodiment, the rear cover 6 may be made of a metallic material by press-work, die-casting or the like. If the resin-made rear cover is made thicker and its mechanical strength is sufficiently high, the insert-plate may not be necessary.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An alternator, comprising:

a housing;

a stator fixedly housed in the housing;

a rotor having a rotor shaft rotatably supported in the housing and disposed inside of the stator with an air gap therebetween;

slip-rings mounted on a rear end of the rotor shaft;

a brush device disposed around the slip-rings, the brush device including brushes slidably contacting the slip-rings for supplying exciting current to the rotor, a brush holder for holding the brushes therein, and a substantially cylindrical slip-ring cover connected to the brush holder; and a rear cover for covering an axial rear end of the brush device, wherein:

the brush device and the rear cover provide a circumferential space surrounding and enclosing the slip rings therein;

the rear cover includes a ventilation passage, formed on its surface facing the brush device, for ventilating the circumferential space;

the ventilating passage is labyrinth-shaped;

one end of the ventilation passage is open to the circumferential space and the other end of the ventilation passage is open to an outside space of the brush device; and the rear cover further includes a fringe wall formed around the other end of the ventilation passage that opens to the outside space of the brush device, the fringe wall extending in the axial direction of the rotor shaft.

2. An alternator, comprising:

a housing;

a stator fixedly housed in the housing;

a rotor having a rotor shaft rotatably supported in the housing and disposed inside of the stator with an air gap therebetween;

slip-rings mounted on a rear end of the rotor shaft;

a brush device disposed around the slip-rings, the brush device including brushes slidably contacting the slip-rings for supplying exciting current to the rotor, a brush holder for holding the brushes therein, and a substantially cylindrical slip-ring cover connected to the brush holder; and a rear cover for covering an axial rear end of the brush device, wherein:

the brush device and the rear cover provide a circumferential space surrounding and enclosing the slip rings therein;

the rear cover includes a ventilation passage, formed on its surface facing the brush device, for ventilating the circumferential space;

the ventilating passage is labyrinth-shaped;

one end of the ventilation passage is open to the circumferential space and the other end of the ventilation passage is open to an outside space of the brush device; and the rear cover further includes a standing wall located above the other end of the ventilation passage that opens to the outside space of the brush device, the standing wall extending in the axial direction of the rotor shaft so that the standing wall protects the other end of the ventilation passage from being directly hit by water entering into the brush device.

3. An alternator, comprising:

a housing;

a stator fixedly housed in the housing;

a rotor having a rotor shaft rotatably supported in the housing and disposed inside of the stator with an air gap therebetween;

slip-rings mounted on a rear end of the rotor shaft;

a brush device disposed around the slip rings, the brush device including brushes slidably contacting the slip-rings for supplying exciting current to the rotor, a brush holder for holding the brushes therein, and a substantially cylindrical slip-ring cover connected to the brush holder; and a rear cover for covering an axial rear end of the brush device, wherein the brush device and the rear cover provide a circumferential space surrounding and enclosing the slip-rings therein and the rear cover includes a labryrinth-shaped ventilation passage, formed on its surface facing the brush device, for ventilating the circumferential space, the rear cover further including a fringe wall formed around the other end of the ventilation passage that opens to the outside space of the brush device, the fringe wall extending in the axial direction of the rotor shaft.

4. An alternator, comprising:

a housing;

a stator fixedly housed in the housing;

a rotor having a rotor shaft rotatably supported in the housing and disposed inside of the stator with an air gap therebetween;

slip-rings mounted on a rear end of the rotor shaft;

a brush device disposed around the slip-rings, the brush device including brushes slidably contacting the slip-rings for supplying exciting current to the rotor, a brush holder for holding the brushes therein, and a substantially cylindrical slip-ring cover connected to the brush holder; and a rear cover for covering an axial rear end of the brush device, wherein the brush device and the rear cover provide a circumferential space surrounding and enclosing the slip-rings therein and the rear cover includes a labyrinth-shaped ventilation passage, formed on its surface facing the brush device, for ventilating the circumferential space, the rear cover further including a standing wall located above the other end of the ventilation passage that opens to the outside space of the brush device, the standing wall extending in the axial direction of the rotor shaft so that the standing wall protects the other end of the ventilation passage from being directly hit by water entering into the brush device.

5. The alternator as in claim 1, wherein the rear cover is made of a resin material, and includes a strengthening structure for enhancing mechanical strength of a part of the rear cover, the part including at least a portion of the rear cover facing the brush device, the strengthening structure is an insert-plate made of metallic material embedded in the rear cover, the rear cover is fastened to the housing with three or more fastening bolts and nuts, and portions of the insert-plate where the fastening nuts are located are exposed to the outer surface of the rear cover, so that the fastening nuts directly sit on the insert-plate.

6. The alternator as in claim 2, wherein the rear cover is made of a resin material, and the rear cover includes a strengthening structure for enhancing mechanical strength of a part of the rear cover, the part including at least a portion of the rear cover facing the brush device, the strengthening structure is an insert-plate made of metallic material embedded in the rear cover, the rear cover is fastened to the housing with three or more fastening bolts and nuts, and portions of the insert-plate where the fastening nuts are located are exposed to the outer surface of the rear cover, so that the fastening nuts directly sit on the insert-plate.

7. The alternator as in claim 3, wherein the rear cover is made of a resin material, and the rear cover includes a strengthening structure for enhancing mechanical strength of a part of the rear cover, the part including at least a portion of the rear cover facing the brush device, the strengthening structure is an insert-plate made of metallic material embedded in the rear cover, the rear cover is fastened to the housing with three or more fastening bolts and nuts, and portions of the embedded insert-plate where the fastening nuts are located are exposed to the outer surface of the rear cover, so that the fastening nuts directly sit on the insert-plate.

8. The alternator as in claim 4, wherein the rear cover is made of a resin material, and the rear cover includes a strengthening structure for enhancing mechanical strength of a part of the rear cover, the part including at least a portion of the rear cover facing the brush device, the strengthening structure is an insert-plate made of metallic material embedded in the rear cover, the rear cover is fastened to the housing with three or more fastening bolts and nuts, and portions of the insert-plate where the fastening nuts are located are exposed to the outer surface of the rear cover, so that the fastening nuts directly sit on the insert-plate.

9. The alternator as in claim 1, wherein the rear cover is made of a resin material, and further comprises a metal insert plate embedded therein.

10. The alternator as in claim 2, wherein the rear cover is made of a resin material, and further comprises a metal insert plate embedded therein.

11. The alternator as in claim 3, wherein the rear cover is made of a resin material, and further comprises a metal insert plate embedded therein.

12. The alternator as in claim 4, wherein the rear cover is made of a resin material, and further comprises a metal insert plate embedded therein.

\* \* \* \* \*